United States Patent [19]

Gove et al.

[11] Patent Number: 5,796,442
[45] Date of Patent: Aug. 18, 1998

[54] MULTI-FORMAT TELEVISION RECIEVER

[75] Inventors: Robert J. Gove, Los Gatos, Calif.;
John R. Reder, Richardson, Tex.; Scott D. Heimbuch; Vishal Markandey, both of Dallas, Tex.; Stephen W. Marshall, Richardson, Tex.

[73] Assignee: Texas Instruments Incorporated, Dallas, Tex.

[21] Appl. No.: 333,200

[22] Filed: Nov. 2, 1994

[51] Int. Cl.$^6$ .................. H04N 5/46; H04N 5/445
[52] U.S. Cl. .................. 348/556; 348/558; 348/564; 348/565
[58] Field of Search .................. 348/555, 556, 348/557, 558, 563, 564, 565, 566, 569; H04N 5/46, 5/445, 5/45, 5/50

[56] References Cited

U.S. PATENT DOCUMENTS

| | | | |
|---|---|---|---|
| 4,688,082 | 8/1987 | Kato | 348/555 |
| 5,061,049 | 10/1991 | Hornbeck | 359/224 |
| 5,208,660 | 5/1993 | Yoshida | 348/555 |
| 5,218,436 | 6/1993 | Sugiyama et al. | |
| 5,351,087 | 9/1994 | Christopher et al. | |
| 5,489,952 | 2/1996 | Gove | 348/771 |
| 5,526,051 | 6/1996 | Gove | 348/388 |
| 5,680,156 | 10/1997 | Gove | 345/154 |

FOREIGN PATENT DOCUMENTS

| | | |
|---|---|---|
| 0 391 529 | 10/1990 | European Pat. Off. |
| 0 587 130 A2 | 3/1994 | European Pat. Off. |
| WO 92/09172 | 5/1992 | WIPO |

*Primary Examiner*—Sherrie Hsia
*Attorney, Agent, or Firm*—Charles A. Brill; James C. Kesterson; Richard L. Donaldson

[57] ABSTRACT

A television system 106 and display method for receiving and displaying television broadcasts having various formats. The television system resizes (106) the various received image formats for display on a common display device. Images are resized horizontally by altering the rate at which data is sampled by the television (106). Images are resized vertically by using vertical scaling algorithms which alter the number of lines in an image. Format detection may be done automatically by decoding information contained in the vertical interval of the television broadcast signal, or by counting the number of lines in each frame. The input format may be indicated by a viewer.

16 Claims, 5 Drawing Sheets

| INPUT SOURCE (RESOLUTION) | 853X480 PIXEL DISPLAY | | 1024X576 PIXEL DISPLAY | |
|---|---|---|---|---|
| | HORIZONTAL SAMPLES | VERTICAL (IN/OUT) | HORIZONTAL SAMPLES | VERTICAL (IN/OUT) |
| STANDARD NTSC (640X480) | 640 | 1:1 | 768 | 6:5 |
| 16:9 NTSC (853X480) | 853 | 1:1 | 1024 | 6:5 |
| LETTER-BOX NTSC (640X360) | 853 | 3:4 | 1024 | 5:8 |
| STANDARD PAL (768X576) | 640 | 6:5 | 768 | 1:1 |
| 16:9 PAL (1024X576) | 853 | 6:5 | 1024 | 1:1 |
| LETTER-BOX PAL (768X432) | 853 | 9:10 | 1024 | 3:4 |
| STANDARD SECAM (768X576) | 640 | 6:5 | 768 | 1:1 |
| 16:9 SECAM (1024X576) | 853 | 6:5 | 1024 | 1:1 |
| LETTER-BOX SECAM (768X432) | 853 | 9:10 | 1024 | 3:4 |
| VGA (640X480) | 640 | 1:1 | 768 | 6:5 |

MULTI-FORMAT TELEVISION RECIEVER

FIELD OF THE INVENTION

This invention relates to the field of television systems, more particularly to television display systems that are capable of displaying images having multiple aspect ratios.

BACKGROUND OF THE INVENTION

There are many television broadcast standards in existence today. The most common standard, used in the United States, is the National Television Systems Committee (NTSC) standard which provides for an interlaced image with a 4:3 aspect ratio having a 59.94 Hz field rate and 525 lines per field. The video data transmitted by the NTSC television broadcast signal is an analog signal that may be digitally sampled to yield 640 square pixels horizontally on each of 480 lines. The remaining lines of broadcast data are used for the vertical retrace interval and to convey other information such as closed captioning data. The horizontal and vertical resolution of an image is typically expressed as an array of pixels, for example an NTSC image is denoted 640×480. European standards include Phase Alternating Line (PAL) and Sequential Coleur Avec Memoire (SECAM) which are both interlaced, 4:3 systems that specify a 50 Hz field rate, 625 lines per field signal that produces a 768×576 image of square pixels. These existing 4:3 standards are called Standard Television (STV).

High-definition television (HDTV) systems have been proposed that transmit wider images having a 16:9 aspect ratio, and a much higher resolution compared to NTSC, PAL, and SECAM. HDTV standards include US-HD (United States High-Definition), HD-MAC (High-Definition Multiplexed Analogue Component), and MUSE (Multiple Sub-Nyquist-Sampling Encoding). Because the proposed HD broadcast standards require a much higher transmission bandwidth compared to the existing STV standard broadcasts, there are many technical and commercial impediments delaying the introduction of HD broadcasts.

A group of interim standards has been proposed that are intended to achieve much of the image improvement promised by HDTV at a much lower cost. These Wide-Television (Wide-TV) standards typically broadcast a 16:9 interlaced image with a resolution that is equivalent to today's STV. These wide-TV standards include wide-NTSC which transmits a video signal that can be sampled to produce a 853×480 image, as well as wide-PAL and wide-SECAM, both of which produce a 1024×576 image.

In addition to the broadcast formats discussed above, some video sources use what is called a letter-box format. Letter-box formatting is used to allow the transmission of wide video images that were originally created for cinema theater projectors to be transmitted via STV formats. Typically, the cinema image is scaled to a 640×360 image and broadcast with 60 blank lines of image data before and after the 360 lines of actual image data, resulting in a standard 640×480 transmission. Unfortunately, just as there is no standard aspect ratio for cinema images, there is no true standard transmission format for letter-box video images. However, most letterbox video signals may be approximated by a 640×360 pixel image with only a slight over- or under-scan. Another transmission standard commonly in use today is the Video Graphics Adapter (VGA) standard used by personal computers. There are many modes of VGA images which specify different pixel resolutions. For the purposes of this disclosure, it will be assumed that VGA images are progressively scanned (proscan) 640×480 images and have a 4:3 image aspect ratio, although the principles of this invention apply equally well to other VGA modes.

Typically, television display systems are only capable of receiving one broadcast format. In the past that has been acceptable to consumers because only one television broadcast format was available in each location and the television broadcast standard was well established and therefore very stable. With the impending arrival of wide-TV and HDTV, it is envisioned that not only will more than one broadcast standard will be available to consumers in many locations, but that existing standards will gradually become obsolete. Therefore, there is a need for a multi-format television display system that is capable of displaying broadcast and computer generated images having both 4:3 and 16:9 aspect ratios.

SUMMARY OF THE INVENTION

The present invention discloses a method and system for displaying broadcast and computer generated images of various aspect ratios and resolutions on a common display device. In accordance with the present invention, a multi-format television receiver system comprises a tuner circuit for receiving a television broadcast signal and outputting a video signal, a digital programmable signal processor circuit for receiving and processing the video signal from the tuner circuit and for producing a display-ready video signal, and a display device for receiving the processed video signal from the programmable signal processor and for producing a visual representation of the enhanced video signal.

Further in accordance with the present invention, a television image is produced by receiving a television broadcast signal having a broadcast format, determining the broadcast format of the television broadcast signal, selectively processing the received television broadcast signal, the processing being dependent on the broadcast format of the received television broadcast signal, and displaying the processed broadcast signal on a display device.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a table listing a summary of some of the possible input and output formats and dimensions the disclosed multi-format television is designed to accommodate;

DETAILED DESCRIPTION

A new television architecture has been developed that is capable of displaying both standard television broadcasts (STV) having aspect ratios, i.e. the ratio of image width to image height, of 4:3 and wide television broadcasts (wide-TV) having aspect ratios of 16:9. The television architecture also includes a video graphics adapter (VGA) input to allow the television to display images created by VGA-compatible computers. Televisions using this architecture digitize an input video signal, allowing the extensive use of digital signal processing hardware as well as the use of a digital display. The digital signal processing hardware is programmed to process multiple display formats and signal transmission standards to optimize the translation between broadcast image format and display format.

The disclosed television is capable of receiving and efficiently displaying images from any format on a single display device. In order to maximize the size of the displayed image, the display data is scaled, enlarged or reduced, such that the image fills the display device in at least one dimension. This scaling is most efficiently performed by a programmable digital signal processor as disclosed herein. Ideally the display device is a digital display device such as a digital micromirror device (DMD), as taught by commonly assigned U.S. Pat. No. 5,061,049, "Spatial Light Modulator and Method," issued Oct. 29, 1991, or a liquid crystal display (LCD). Analog displays, such as the traditional cathode ray tube (CRT) could be used but would require that the display data be converted from digital to analog format.

FIG. 1 is a table listing a summary of some of the possible input and output formats and dimensions the multi-format television is designed to accommodate. In addition to the various modes of letter-box and VGA broadcasts discussed earlier which alter the number of lines transmitted, the actual broadcast signals are un-pixelated analog video signals and may be sampled at various rates to yield different array sizes. The array size shown below for input source resolution assumes that the analog video signal has been sampled to produce an array of square pixels.

Figure 2:
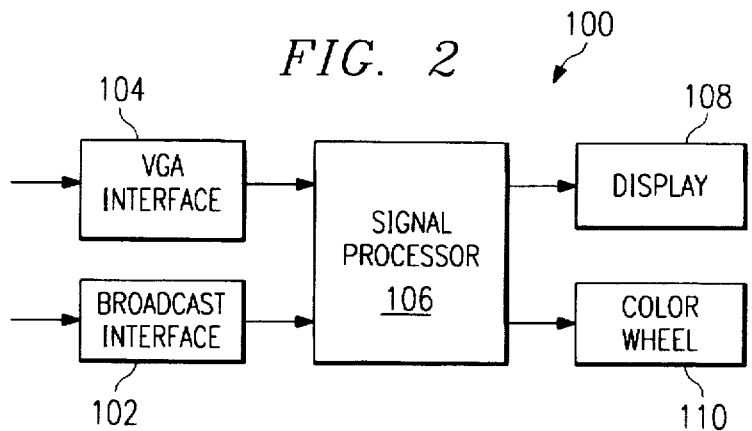
FIG. 2 is a block diagram of a television system according to one embodiment of the present invention.

FIG. 2 is a block diagram of a television 100 in accordance with the present invention. The television 100 is assumed to be a projection television and is comprised of a broadcast interface 102, a VGA interface 104, a signal processor 106, a display 108, and a color wheel 110. Not shown in FIG. 2 are the light source, projection optics, and power supplies necessary to complete the projection television. The television system shown in FIG. 2 is a sequential color system, wherein each of the three constituent single-color images required to produce a full color image is serially projected by the display 108. If the display 108 is capable of producing a full-color image, the color wheel 110 would not be required.

Figure 3:
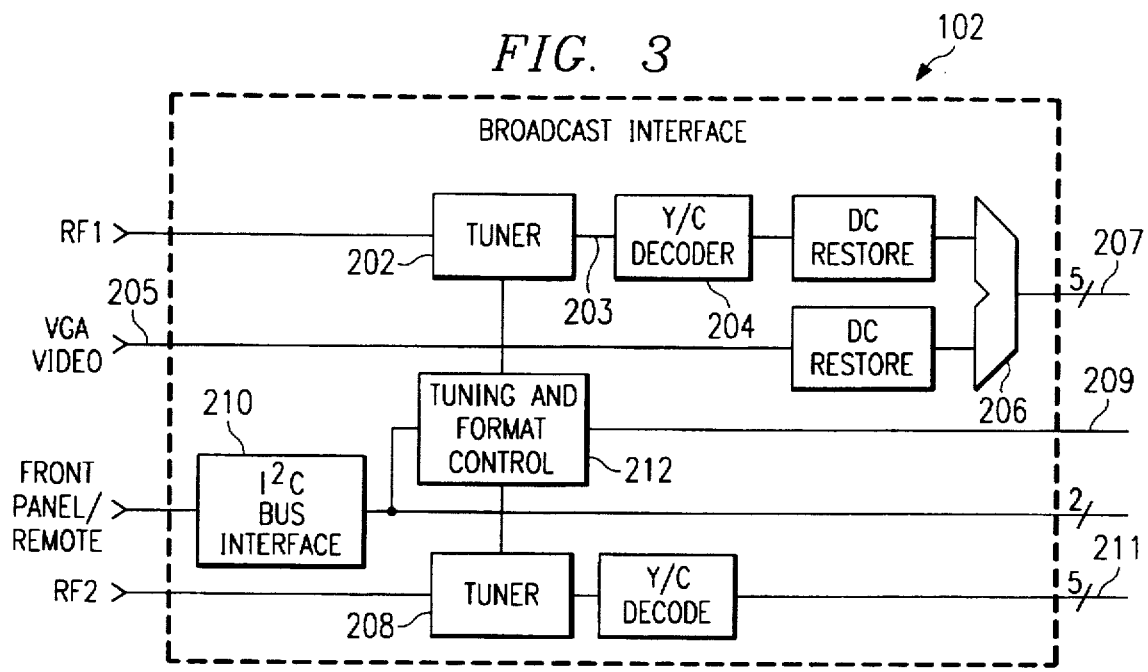
FIG. 3 is a block diagram of an embodiment of the broadcast interface of FIG. 1.

FIG. 3 depicts in greater detail the broadcast interface 102 of FIG. 2. As shown in FIG. 3, the broadcast interface 102 includes a first tuner 202 to allow the demodulation of a primary broadcast video signal 203. After being demodulated, the luminance and chrominance components, as well as the horizontal and vertical synchronization components of the primary broadcast video signal 203 are separated by Y/C decoder 204. The symbol "Y" is used to identify the luminance component of the decoded video signal, and the symbol "C" is used to identify the chrominance component of the video signal. The chrominance component of the video signal is further decoded into two color difference signals. The color difference signals of an NTSC transmission are denoted by "I" and "Q" while "U" and "V" are used to denote the color difference signals of a PAL or SECAM transmission.

The broadcast interface 102 also includes an optional VGA input port 205 for receiving computer generated video images. A multiplexer 206 selects either the VGA video signal from the VGA input port 205 or the primary broadcast video signal 203 as the primary video signal 207 which is input into the signal processor 106. The broadcast interface 102 may also include one or more additional tuners 208 for demodulating secondary channels. The video signals 211 from these secondary channels are spliced into the video signal from the primary channel by the signal processor 106 to implement a picture-in-a-picture (PIP) or a picture-outside-a-picture (POP). An additional function included in the broadcast interface is the I²C bus interface 210 which decodes standard I²C system commands from the front-panel television controls and from an infra-red remote control. The tuning and format control block 212 controls the operation of the tuners 202, and 208, and outputs a signal 209 to the signal processor indicating the format of the video input and the desired image output format.

In some cases, the input format is automatically determined, typically by counting the number of image lines transmitted. In other cases, the input format will have to be manually selected by the viewer. Of course the format selections may be stored by the tuning and format control block 212 to allow the television to associate a broadcast format with each channel. It is also possible to transmit a format selection signal along with the video information by encoding a format selection signal in the vertical interval of the transmitted video signal. For example, NTSC standards include 40 lines of vertical blanking to allow the electron beam of a CRT to vertically retrace. A portion of one of these 40 lines could be designated to include an encoded format signal to allow the tuning and format control block 212 to automatically determine the video signal format and select the appropriate display format.

Figure 4:
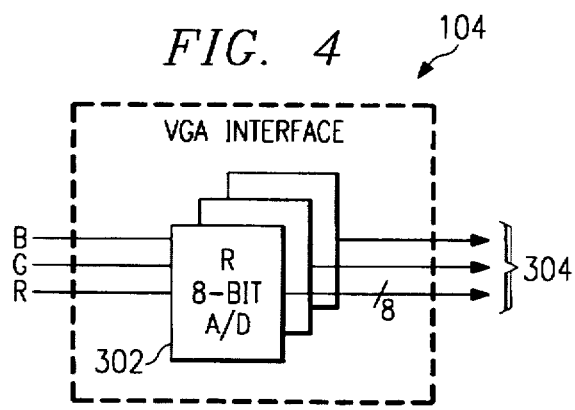
FIG. 4 is a block diagram of an embodiment of the VGA interface of FIG. 1.

FIG. 4 shows an optional VGA interface 104 that is an alternative to the VGA input port 205 shown in FIG. 3. As shown in FIG. 4, the VGA interface 104 is comprised of an analog-to-digital converter (ADC) 302 for each of the three color components. The optional VGA interface 104 increases the television system 100 cost but allows the computer generated VGA input signal 304 to bypass some of the signal processing hardware that is not required to display the proscan VGA image.

Figure 5:
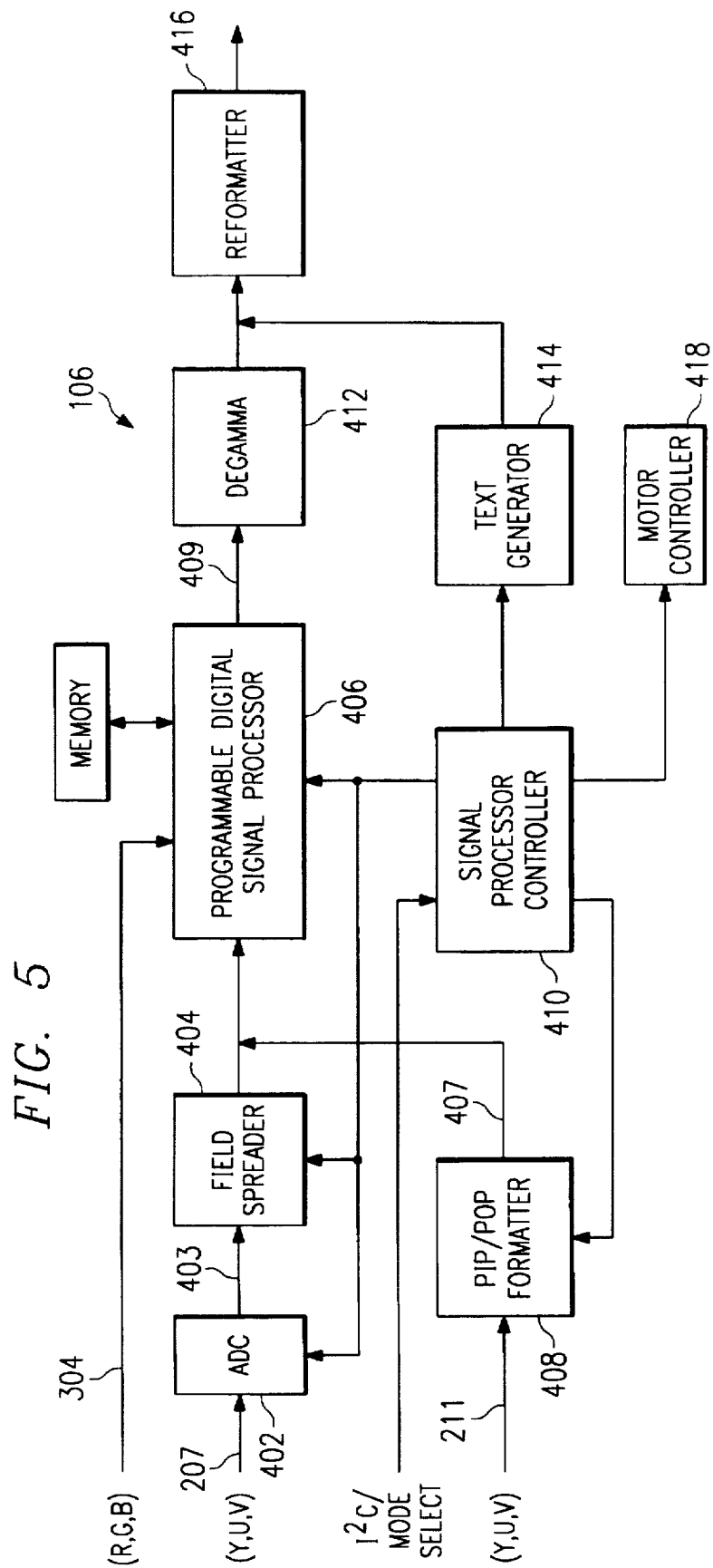
FIG. 5 is a block diagram of an embodiment of the signal processor of FIG. 1.

FIG. 5 shows a block diagram of a signal processor 106 according to one embodiment of the present invention. The primary video signal 207 from the broadcast interface, in analog Y, U, V format, is input to an ADC module 402 where it is converted to a stream of digital video data 403. The resolution of the ADCs is typically 8 bits. The rate at which the ADC 402 samples the incoming video signal depends on the display format selected. In most cases, the sample rate will be adjusted so that each line of video data is sampled once for each pixel in a row of the display device. Typical sample rates are 12.27 MHz for an NTSC signal, 14.75 MHz for PAL, and 25.2 MHz for a VGA input signal. As taught in commonly assigned U.S. Pat. Application 08/161,832, "DMD Architecture to Improve Horizontal Resolution," filed Dec. 3, 1993, (Texas Instruments, Inc., Docket TI-17405), and co-filed U.S. Pat. Application 08/332,545, "A New Digital Micromirror Architecture for Wide Display Applications," which are hereby incorporated by reference, a display device with staggered rows of pixels may be used to increase the effective horizontal resolution of a display without increasing the number of pixels in each row. If a staggered pixel grid is used, the sampling of alternate rows of input data is delayed to align the samples with the pixel grid.

After the primary video signal 207 is sampled, the digital video data 403 is input into a field spreader 404. Standard television transmission formats transmit each line of data separately followed by a horizontal retrace period in which no image data is transmitted. The purpose of a field spreader 404 is to change the digital video data 403 from a series of line bursts to a uniform stream of digital video data that is transmitted at a constant data rate, reducing the peak data rate of the digitized video signal. Each field spreader 404 is essentially a first-in-first-out memory (FIFO) which allows data to be written into the FIFO at a high rate and read out of the FIFO at a much lower rate. Data read out of the field spreader 404 is input into a programmable digital signal processor 406.

The secondary video signals 211 from the PIP/POP tuner 208 are converted to a digital video signal 407 by the PIP/POP formatter 408. The PIP/POP formatter 408 receives timing and control signals from the signal processor controller 410 which allow the PIP/POP formatter 408 to reduce the size of the secondary video image. This size reduction, or decimation, is implemented by reducing the sample rate of the PIP/POP formatter 408. For example, if the display device 108 is displaying an 853×480 image, which includes a primary image and a secondary wide-NTSC image that is ⅟₁₆th as large as the primary image, the PIP/POP formatter samples every fourth line of data 213 times. This results in a 213×120 PIP image that is spliced into the image data stream under the control of the signal processor controller 410. The signal processor controller 410 receives control data from the I²C bus and mode select signals from the broadcast interface block 102 and coordinates the operation of the signal processor 106.

Figure 6:
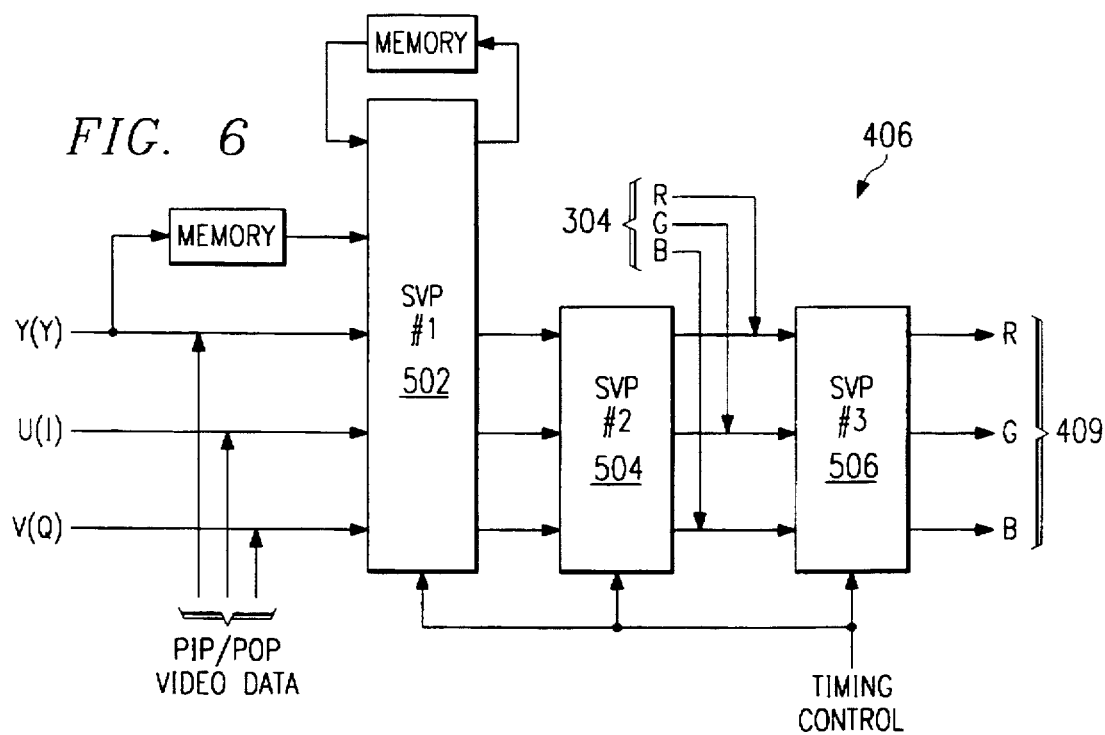
FIG. 6 is a block diagram of an embodiment of the programmable digital signal processor of FIG. 4.

The programmable digital signal processor 406 is capable of executing various image processing algorithms depending on the image input and display formats as well as the image data. FIG. 6 shows one embodiment of a programmable digital signal processor 406 according to the present invention. As shown in FIG. 6, the programmable digital signal processor 406 may include three separate processors 502, 504, 506. In the example shown, each processor 502, 504, 506 is a Scan-line Video Processor (SVP) which is sold by Texas Instruments Incorporated, part numbers TMC57102 and TMC57110.

The SVPs 502, 504, 506 perform several image manipulation functions including sharpness filtering, vertical filtering, proscan conversion, vertical scaling, and color space conversion. In the embodiment shown in FIG. 6, SVP #1 502 performs the sharpness and vertical filtering and the proscan conversion on the luminance signal. Vertical filtering, sharpness control, and proscan conversion are taught in commonly assigned U.S. Pat. Applications 08/091, 852, "Method and Device for Multi-Format Television," filed Jul. 14, 1993, (Texas Instruments, Inc., docket TI-17113), and 08/147,249, "Digital Television System," filed Oct. 27, 1993, (Texas Instruments, Inc., docket TI-17855) which are hereby incorporated by reference.

SVP #2 504 performs vertical scaling and proscan conversion of the color signals. Horizontal scaling was accomplished by adjusting the sample rate of the ADC 402 to obtain the proper number of samples per row of the displayed image. However, because each row is transmitted separately, the vertical scaling cannot be accomplished by changing a sampling rate. The vertical dimension of a video frame may be expanded or contracted by vertical scaling. Several methods of vertical scaling, including bilinear and cubic interpolation, may be used to alter the vertical dimension of the video frame.

Figure 7:
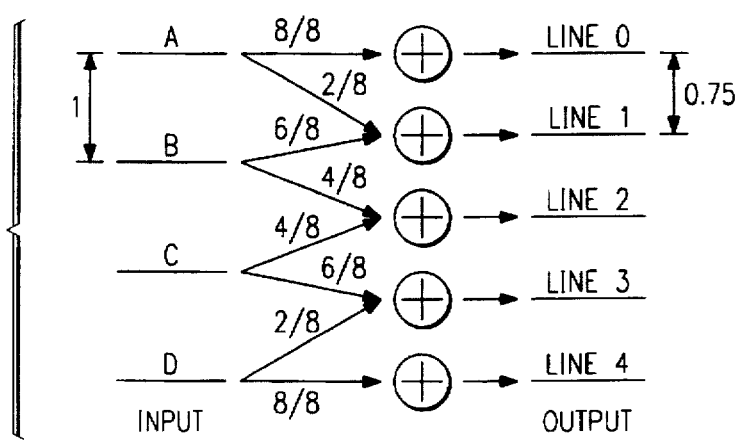
FIG. 7 is an illustration of the bilinear interpolation algorithm for scaling three lines of input video data into four lines of output video data.

FIG. 7 illustrates bilinear interpolation for scaling three lines of input video signal into four lines of output video signal. The three input lines are designated as line A through line C. The four output lines are designated as line 0 through line 3. Line A through line C may be scaled to produce line 0 through line 3 with a small contribution from line D according to equations (1a) through (1d):

$$\text{Line } 0 = A \tag{1a}$$

$$\text{Line } 1 = 2/8A + 6/8B \tag{1b}$$

$$\text{Line } 2 = 4/8B + 4/8C \tag{1c}$$

$$\text{Line } 3 = 6/8C + 2/8D \tag{1d}$$

Beginning with line D, the next three lines of input video signal may also be scaled to four output video lines according to equations (1a) through (1d). The bilinear scaling function of equations (1a) through (1d) may be repeatedly applied to the remaining input lines to produce corresponding sets of output lines.

Similarly, nine lines of input video signal may be converted to ten lines of video output according to equations (2a) through (2j) below:

$$\text{Line } 0 = A \tag{2a}$$

$$\text{Line } 1 = 0.1A + 0.9B \tag{2b}$$

$$\text{Line } 2 = 0.2B + 0.8C \tag{2c}$$

$$\text{Line } 3 = 0.3C + 0.7D \tag{2d}$$

$$\text{Line } 4 = 0.4D + 0.6E \tag{2e}$$

$$\text{Line } 5 = 0.5E + 0.5F \tag{2f}$$

$$\text{Line } 6 = 0.6F + 0.4G \tag{2g}$$

$$\text{Line } 7 = 0.7G + 0.3H \tag{2h}$$

$$\text{Line } 8 = 0.8H + 0.2I \tag{2i}$$

$$\text{Line } 9 = 0.9I + 0.1J \tag{2j}$$

The input video lines are referred to as line A through line J. The output video lines are referred to as line 0 through line 9. Beginning with line J, the next nine lines of input video signal may also be scaled to ten output video lines according to equations (2a) through (2j). The bilinear scaling function of equations (2a) through (2j) may be repeatedly applied to the remaining input lines to produce corresponding sets of output lines.

Figure 8:
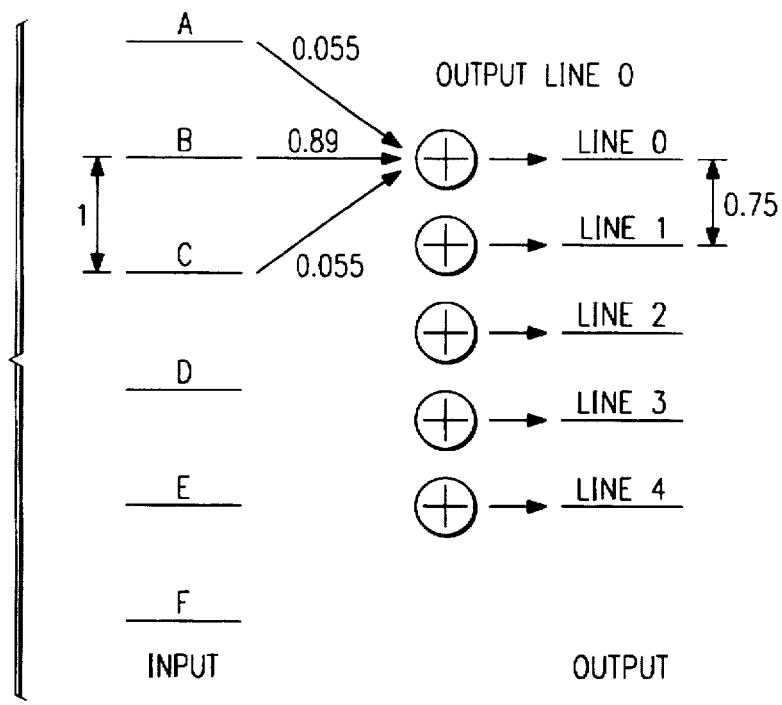
FIGS. 8 and 9 are illustrations of the cubic interpolation algorithm for scaling three lines of input video data into four lines of output video data.
Figure 9:
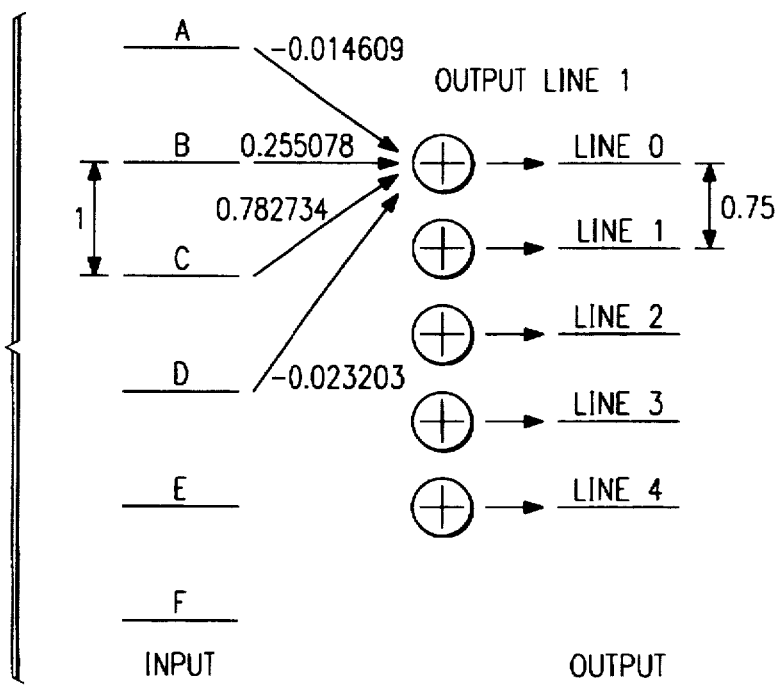

As an alternative to the bilinear interpolation described above, FIGS. 8 and 9 illustrate cubic interpolation for scaling three lines of input video signal into four lines of output video signal. The three input lines are designated as line B through line D. The four output lines are designated as line 0 through line 3. Line B through line D may be scaled to produce line 0 through line 3 with small contributions from line A, line E, and line F according to equations (3a) through (3d):

$$\text{Line } 0 = 0.055A + 0.89B + 0.055C \tag{3a}$$

$$\text{Line } 1 = -0.014609A + 0.244078B + 0.782734C - 0.023203D \tag{3b}$$

$$\text{Line } 2 = -0.034375B + 0.534375C + 0.534375D - 0.034375E \tag{3c}$$

$$\text{Line } 3 = -0.023203C + 0.782734D + 0.255078E - 0.014609F \tag{3d}$$

Beginning with line D, the next three lines of input video signal may also be scaled to four output video lines according to equations (3a) through (3d). The cubic scaling function of equations (3a) through (3d) may be repeatedly applied to the remaining input lines to produce corresponding sets of output lines.

Similarly, cubic interpolation may also be used to scale nine lines of input video signal to ten lines of video output according to equations (4a) through (4j) below:

$$\text{Line } 0 = 0.55A + 0.89B + 0.55C \tag{4a}$$

$$\text{Line } 1 = -0.002915A + 0.118475B + 0.871075C - 0.013365D \tag{4b}$$

$$\text{Line } 2 = -0.01012B + 0.205200C + 0.819D - 0.01408E \tag{4c}$$

$$\text{Line } 3 = -0.019305C + 0.308125D + 0.740825E - 0.029645F \tag{4d}$$

$$\text{Line } 4 = -0.02816D + 0.4202E + 0.6436F - 0.03564G \tag{4e}$$

$$\text{Line } 5 = -0.034375E + 0.534375F + 0.534375G - 0.034375H \tag{4f}$$

$$\text{Line } 6 = -0.03564F + 0.6435G + 0.4202H - 0.02816I \tag{4g}$$

$$\text{Line } 7 = -0.029645G + 0.740825H + 0.308125I - 0.019305J \tag{4h}$$

$$\text{Line } 8 = -0.014080H + 0.819I + 0.2052J - 0.01012K \tag{4i}$$

$$\text{Line } 9 = -0.013365I + 0.871075J + 0.118475K - 0.002915L \tag{4j}$$

The input video lines are referred to as line B through line J. The output video lines are referred to as line 0 through line 9. Beginning with line J, the next nine lines of input video signal may also be scaled to ten output video lines according to equations (4a) through (4j). The cubic scaling function of equations (4a) through (4j) may be repeatedly applied to the remaining input lines to produce corresponding sets of output lines.

SVP #3 506 performs a color space conversion algorithm which changes the video data from either the YUV or YIQ formats to RGB format. SVP #3 504 performs a matrix multiplication in order to convert from one color space conversion to another. A video signal in the NTSC format may be converted to the RGB format by using equation (5):

$$\begin{bmatrix} R \\ G \\ B \end{bmatrix} = \begin{bmatrix} 1.0 & 0.96 & 0.62 \\ 1.0 & -0.28 & 0.65 \\ 1.0 & -1.1 & 1.7 \end{bmatrix} \begin{bmatrix} Y \\ I \\ Q \end{bmatrix} \tag{5}$$

A video signal in either PAL or SECAM format may be converted to the RGB color space by using equation (6):

$$\begin{bmatrix} R \\ G \\ B \end{bmatrix} = \begin{bmatrix} 1.0 & 1.14 & 0 \\ 1.0 & -0.581 & -0.395 \\ 1.0 & 0 & 2.032 \end{bmatrix} \begin{bmatrix} Y \\ V \\ U \end{bmatrix} \tag{6}$$

According to one embodiment of the present invention, SVP #3 506 is used to connect the VGA input signal 304, which is already in RGB format, into the display data stream. The VGA input signal 304 could be multiplexed onto the display data stream by a separate multiplexer, but SVP #3 506 has available inputs and therefore does not require additional components in order to perform the multiplex function. When a VGA input signal is being displayed, the color space conversion algorithms are disabled. Alternately, the VGA input signal 304 is multiplexed onto the display data stream by SVP #2 504. This alternate embodiment would allow SVP #2 504 to scale the VGA input signal 304.

Although the above description has described one embodiment for a programmable digital signal processor 406 comprised of three SVPs 502, 504, 506, it should be understood that other types and quantities of processors, as well as alternate algorithms may be used without departing from the disclosed invention.

Referring back to FIG. 5, the formatted video data 409 from the programmable digital signal processor 406, which is now in RGB format, is input into a degamma lookup table 412. Degamma lookup tables 412 are taught in commonly assigned U.S. Pat. Application 08/160,633, "Technique to Increase the Apparent Dynamic Range of a Visual Display," filed Dec. 2, 1993, (Texas Instruments, Inc. docket TI-17403) and are used to correct the intensity of a video signal for display by a non-CRT display device. On-screen-display (OSD) and closed-captioning (CC) text information may be added to the data stream by the text generator circuit 414. The OSD and CC text information may be added to the data stream either before or after the video signal has been gamma-corrected. The video data is then input into a reformatter 416 which receives data in a raster-scan format and outputs data to the display 108 in the order in which it will be displayed. A suitable reformatter is taught in co-filed U.S. Pat. Application 08/333,199, U.S. Pat. No. 5,680,156, "Memory Architecture for Reformatting and Storing Display Data in Standard TV and HDTV Systems," which is hereby incorporated by reference. Signal processor controller 410 also controls the motor controller circuit 418 which ensures the synchronous operation of the signal processor 106, the display device 108, and the color wheel 110.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims which follow.

What is claimed is:

1. A multi-format television receiver system for receiving and displaying television signals broadcast in multiple formats, the receiver system comprising:

a tuner circuit for receiving a television broadcast signal and outputting a first video signal having a broadcast format;

at least one digital programmable signal processor circuit for receiving and processing the first video signal from the tuner circuit and for producing a second video signal, the digital programmable signal processor circuit for processing video signals having multiple broadcast formats, wherein the processing performed is dependent on the broadcast format of the received television broadcast signal;

at least one field spreader for receiving bursts of the first video signal from said tuner circuit, and for outputting the first video signal at a constant rate to the digital programmable signal processor circuit; and at least one display device for receiving the second video signal from the digital programmable signal processor circuit and for producing a visual representation of the second video signal.

2. The television receiver system of claim 1 further comprising:

a second tuner circuit for receiving and decimating a second television broadcast signal and for outputting a decimated video signal to the digital programmable signal processor circuit, wherein the first video signal and the decimated video signal are simultaneously displayed by the display device.

3. The television receiver system of claim 1 wherein the digital programmable signal processor circuit includes an alternate video input for receiving an alternate video signal.

4. The television receiver system of claim 3 wherein the alternate video signal is progressively-scanned.

5. The television receiver system of claim 3 wherein the alternate video signal is an RGB format video signal.

6. The television receiver system of claim 3 wherein the alternate video signal is a VGA format video signal.

7. The television receiver system of claim 1 further comprising:
a timing controller for synchronizing the operations of the tuner circuit, the digital programmable signal processor circuit, and the display device.

8. The television receiver system of claim 7 further comprising:
a color wheel and motor, wherein the timing controller synchronizes the operation of the display device and the color wheel and motor.

9. The television receiver system of claim 1 further comprising:
at least one data reformatter in the path of the second video signal for receiving the second video signal from the digital programmable signal processor circuit and for outputting a reformatted second video signal to the display device.

10. The television receiver system of claim 5 wherein the display device is a digital micromirror device.

11. The television receiver system of claim 1 wherein the display device is a cathode ray tube.

12. The television receiver system of claim 1 wherein the display device is a liquid crystal display panel.

13. The television receiver system of claim 1 further comprising:
a format detection circuit for receiving the first video signal and determining the format of the first video signal, wherein the format detection circuit communicates the format of the received video signal to the digital programmable signal processor circuit thereby determining the processing performed by the digital programmable signal processor circuit.

14. A method of producing a television image, said method comprising the steps of:
receiving a television broadcast signal, the television broadcast signal having a broadcast format;

determining the broadcast format of the television broadcast signal;

converting the television broadcast signal from a format in which image data is transmitted in bursts to a format in which the image data is transmitted at a constant rate;

selectively processing the converted television broadcast signal, the processing being dependent on the broadcast format of the received television broadcast signal;

displaying the processed broadcast signal on a display device; and synchronizing the receiving, selectively processing and displaying steps.

15. The method of claim 14 further comprising the steps of: receiving a second television broadcast signal;

decimating the second television broadcast signal; and simultaneously displaying both the decimated second television broadcast signal and the processed broadcast signal on the display device.

16. The method of claim 14 wherein the determining step comprises the step of detecting information encoded in the vertical interval of the received television broadcast signal.

* * * * *